US006693903B1

(12) United States Patent
Shively (10) Patent No.: US 6,693,903 B1
(45) Date of Patent: Feb. 17, 2004

(54) CIRCUIT SWITCHED SWITCHING SYSTEM (75) Inventor: Richard Robert Shively, Convent Station, NJ (US)

(73) Assignee: AT & T Corp., New York, NY (US)

( * ) Notice: Subject to any disclaimer, the term of this patent is extended or adjusted under 35 U.S.C. 154(b) by 0 days.

(21) Appl. No.: 09/338,661

(22) Filed: Jun. 23, 1999

Related U.S. Application Data (63) Continuation of application No. 08/783,388, filed on Jan. 13, 1997, now Pat. No. 5,978,370.

(51) Int. Cl.[7] .......................... H04L 12/50; H04Q 11/00
(52) U.S. Cl. ...................................... 370/370; 370/411
(58) Field of Search ................................. 370/316, 323, 370/326, 327, 335, 357, 359, 366, 369, 370, 372, 376, 379, 380, 382, 386, 388, 411

(56) References Cited

U.S. PATENT DOCUMENTS

| 3,912,873 A | 10/1975 | Skaperda | 370/372 |
| 3,983,330 A | 9/1976 | Tongi | 370/371 |
| 4,038,497 A | 7/1977 | Collins et al. | 370/361 |
| 4,495,615 A | 1/1985 | Wilcke | 370/370 |
| 4,862,451 A | 8/1989 | Closs et al. | 370/413 |
| 4,972,407 A | * 11/1990 | Kawai | 370/376 |
| 5,351,238 A | * 9/1994 | Ashi et al. | 370/376 |
| 5,390,333 A | * 2/1995 | Pritt et al. | 365/227 |
| 5,475,679 A | 12/1995 | Munter | 370/395 |
| 5,509,005 A | * 4/1996 | Nagamoto | 370/376 |
| 5,555,245 A | * 9/1996 | Alatalo et al. | 370/375 |

* cited by examiner

Primary Examiner—Chau Nguyen
Assistant Examiner—Soon-Dong Hyun (57) ABSTRACT

A circuit switched switching system and method includes a plurality of matrix transposition memories. The memories permute the order of incoming and outgoing data, and thereby increase the efficiency of the switch. The switch and matrix transposition memories may be disposed in a satellite. The switch may further include batching circuits for grouping together data from a single terminal device for more efficient transmission through the switch and for more efficient error correction.

4 Claims, 7 Drawing Sheets

CIRCUIT SWITCHED SWITCHING SYSTEM

This application is a continuing application of U.S. patent application Ser. No. 08/783,388, filed Jan. 13, 1997, now U.S. Pat. No. 5,978,370.

TECHNICAL FIELD

The present invention relates to circuit-switched (versus packet-switched) switching systems and, in particular, to an improved circuit-switched switching system which decomposes the switching function into multiple stages including batching circuits and an improved transposition matrix.

BACKGROUND OF THE INVENTION

Circuit switched switching systems are conventionally employed in telecommunication systems to create a connection between the originating terminal equipment and the destination terminal equipment. In some circumstances, there exists a need to implement versatile, fully non-blocking circuit-switched systems with a minimum of electronic components and a minimum of power consumed. "Non-blocking" refers to the property that if the destination terminal is idle when called, the switch will provide a path from the originating terminal to that destination terminal regardless of what other traffic goes through the switch. Further, transmission of the data through the switch may be adversely affected by transmission errors which occur in the switch due to upset events such as soft errors. Additionally, conventional circuit switched switching systems are limited in the amount of data that may be transferred due to inherent limitations in the switching speed of the switch.

SUMMARY OF THE INVENTION

Aspects of the present invention include methods and devices useful in an improved circuit-switched switching system. In one aspect of the present invention, the switch includes a double buffering memory which allows data to be selectively transmitted through a time multiplex switch in accordance with a dynamically variable scheduling algorithm. The double buffering memory may be configured to read data into the memory in one order and read data out of the memory in another order. In this manner, the data is selectively routed to one of a plurality of output channels. This double buffered memory system allows the switch to be easily reconfigured to accommodate a plurality of data rates.

Another aspect of the invention for increasing the throughput through the switch is to group multiple consecutive samples from the same channel or device as a single unit of information in the switch. For example, the data from a single terminal device may be batched or grouped together for more efficient transmission through the switch. Since such samples are all being routed identically, a grouping, or batching, of samples in this way enables the switch to operate at a significantly slower rate than if specific samples were switched individually.

A further aspect of this invention is that the number of channels and the symbol rate per channel can be changed under software control, such that a wide mix of channel types can be serviced at one time by the switch. Only the aggregate symbol rate, summed across all channels, may be fixed. Further, the number of channels and channel rates can be dynamically changed for a subset of the channels without affecting the operation of other channels currently in use. If the switch is sized and operated to handle the longest frame, i.e., the frame time corresponding to the slowest sampling rate, then faster-rate channels simply amount to reading from the same sample memory multiple times during the designated frame time. In this manner, the switch maintains significant flexibility for operating with a continuing change in the mix of data signals being transmitted through the switch.

Further, in still other aspects of the invention, the data may be protected with an error correction code after it has been grouped together. The grouping of the data makes the use of error correction codes more efficient by requiring fewer bits of error correcting codes per bits of data. The error correction codes are particularly effective where the memories in the switch are vulnerable to soft error upsets, such as in satellite configurations.

DESCRIPTION OF PREFERRED EMBODIMENTS

Figure 1:
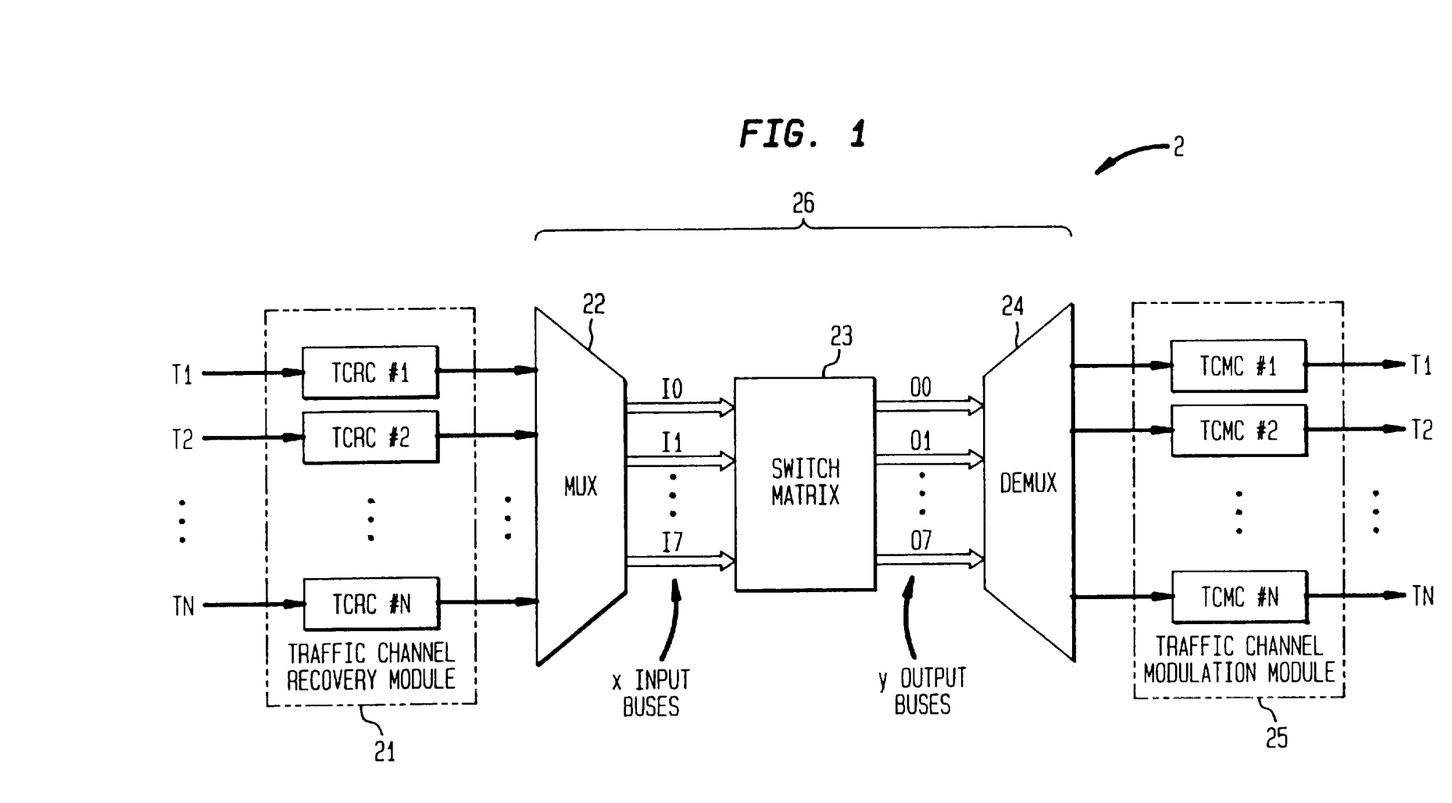
FIG. 1 is a block diagram of a switching system which embodies aspects of the present invention.

Referring to FIG. 1, switch 2 may include a traffic channel recovery module 21 for recovering data bits from the trunk line data streams. The traffic channel recovery module 21 may have a plurality of traffic channel recovery circuits TCRC 1, TCRC 2, . . . TCRC N, where N may be any suitable number. For example, in one embodiment, the number of traffic channel recovery circuits is 1408. Each of the plurality of traffic channel recovery circuits includes an input and an output and operates to transform an associated trunk line data stream into digital data bits. The plurality of traffic channel recovery circuit inputs may be respectively coupled to the plurality of trunk lines T1, . . . TN.

The switch 2 may also include a traffic channel modulation module 25 for modulating samples output from the switch onto an associated trunk line. The traffic channel modulation module 25 may include a plurality of traffic channel modulation circuits TCMC 1, TCMC 2, . . . TCMC N, where N may be any suitable number, e.g., 1408. Each of the plurality of traffic channel modulation circuits may include an input coupled to a time-space-time switch 26 and an output coupled to one or more outputs of the switch 2. The traffic channel modulation circuits preferably operate to assemble and/or modulate samples from the time-space-time switch 26 for output on the outputs of the switch 2. In the illustrated embodiment, the plurality of traffic channel modulation circuit outputs are respectively coupled to the plurality of trunk lines T1, T2, . . . TN.

Referring to the embodiment in FIG. 1, the plurality of traffic channel recovery circuit outputs are coupled to the plurality of traffic channel modulation circuits inputs via the time-space-time switch 26. The time-space-time switch 26 may connect data from any output of the traffic channel recovery module 21 to any input of the traffic channel modulation module 25. The time-space-time switch 26 may include an input multiplexer 22 for multiplexing data bits from each of the trunk line data streams onto a selected one of a plurality of input busses I0, I1, . . . Ix, where x is an integer, e.g., seven. The time-space-time switch 26 may also include an output demultipleker 24 for demultiplexing data bits from each of a plurality of output busses O0, O1, . . . Ox, where x is an integer, e.g., seven, onto a selected one of the plurality of inputs of the traffic channel modulation module 25.

In the embodiment illustrated in FIG. 1, a switch matrix 23 is disposed between the input multiplexer 22 and the output demultipexer 24. The switch matrix 23 couples any channel multiplexed as part of any of the input busses I0, I1, . . . Ix, to any channel multiplexed as part of any of the output busses O1, O2, . . . Ox. The input multiplexer 22 and output demultiplexer 24 are utilized to decrease the complexity of switch matrix 23 such that the number of inputs and outputs of the switch matrix is substantially reduced. Where the traffic channel modules 21, 25 include 1408 individual channels and the inputs/outputs to the switch matrix comprise eight busses, the complexity of the switch matrix is reduced by a factor of 176 times, i.e., 1408 divided by 8. In some embodiments, where fewer than eight busses are utilized in the switch matrix 23, the design of the switch matrix 23 can be problematic when band limited busses (e.g., copper busses) and standard integrated circuits (e.g., CMOS) are utilized in the switch matrix. For example, in some embodiments, reducing the number of busses by one half requires that the speed at which the switch matrix operates to double. For any specific switch matrix configuration, there is a practical upper limit above which error free operation cannot be assured. Consequently, there is a trade off between minimizing the complexity of the switch while still not exceeding the maximum feasible operating frequency of the switch. Details of the time-space-time switch 26 are discussed below with respect to FIG. 6.

Figure 2:
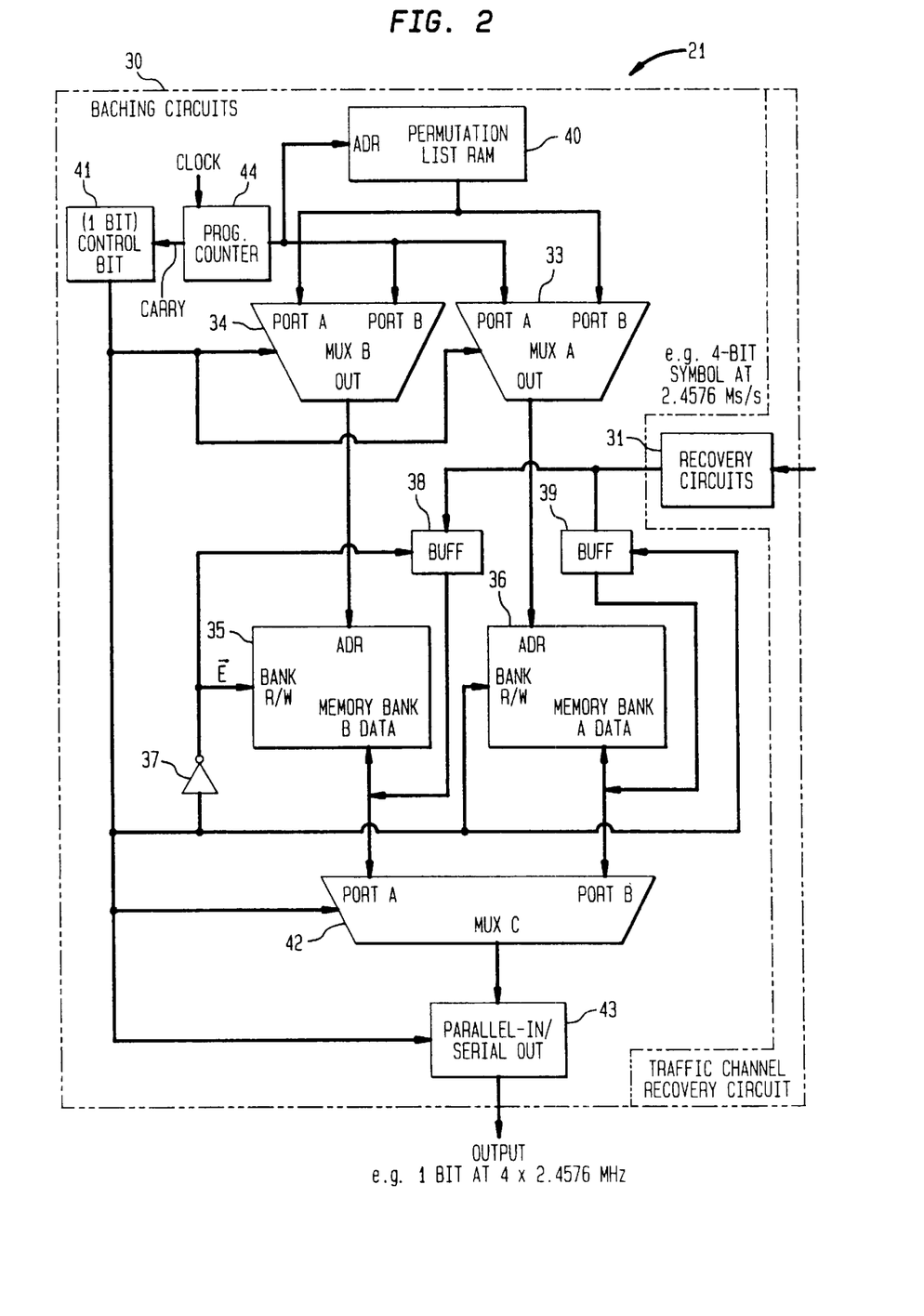
FIG. 2 is a partial block/partial schematic diagram of a first exemplary embodiment of the traffic channel recovery circuits of the switching system shown in FIG. 1.

FIG. 2 shows an exemplary embodiment one of the traffic channel recovery circuits. Each traffic channel recovery circuit may include recovery circuits 31 coupled to batching circuits 30. The recovery circuits 31 may be configured for recovering data bits while the batching circuits 30 may be optionally included for grouping the data bits recovered from the recovery circuits 31.

In an exemplary embodiment of the recovery circuits 31, the recovery circuits may recover the actual data bits contained in each of the data streams by demultiplexing and/or decoding the incoming trunk line data streams. In this manner, the actual data being transmitted by each of the terminal devices is recovered in the switch. However, in a satellite environment, processing capacity of the switch 2 and traffic channel recovery circuits 21 is often limited. Accordingly, recovering the actual data bits from the digital data streams is less preferred.

In alternate embodiments, it is not necessary to analyze the actual data bits from the digital data stream when the switch 2 is a circuit switched switching system. In other words, since the data is switched in accordance with a routing table and not in dependence on header information contained within the data stream, the switch 2 may function without analyzing the actual data bits within the data streams. Accordingly, in an alternate embodiment, the data streams are encoded and modulated using any suitable modulation technique. For example, where 16 point phase shift keying is utilized, a constellation of 16 points on a complex plane are encoded using 4 data bits or symbols by taking a real and imaginary complex sample. In the third exemplary embodiment of the recovery circuits 31, the traffic channel recovery circuits partially decode the data stream information into a plurality of symbols, representative of the data stream information. The partial decoding of the uplink signal into symbols, as opposed to bits, minimizes the processing required by the switch while still quantifying the signal to reduce the signal-to-noise ratio. Decoding only to the symbol level is particularly useful to decrease the processing required in the switch where several levels of data encoding are provided prior to modulating the data. An important result of decoding to the symbol level is that there is little or no loss of signal-to-noise level since the detected symbols are being quantified and then retransmitted in a similar manner as if the underlying bit stream had been detected.

By contrast, packet switched systems must always decode to the bit level and thereafter route incoming packets based on the information obtained from the header. The present apparatus works with raw data and coded data equally well. In either case, the switch 2 switches the information content associated with a particular terminal device without the need to read the information being switched to perform the switching function, i.e., the switch 2 is a circuit switched switch. The information as to how to switch and/or where to switch comes from another source, e.g., a routing table.

For simplicity, the remaining discussion of the switch 2 will be in terms of the processing of samples of data bits which may be either information bits or symbols.

Referring to FIG. 2, the samples output from the recovery circuits 31 may be output from the traffic channel recovery module 21 directly or processed through the batching circuit 30 prior to being output. The batching circuits 30 may be utilized where the samples output from the recovery circuits 31 represents time division multiplexed data from a plurality of terminal devices. The batching circuits may then be utilized to batch or group data samples from successive time slots assigned to the same terminal device into parallel data groups. The time division multiplexed data received from the recovery circuits 31 may be variously configured. For example, the trunk line data streams may be assembled using time division multiplexing by interleaving one or more bits of data from each terminal device with one or more bits of data from every other terminal device.

The frequency of the time slots allocated to a particular terminal device and the number of terminal devices associated with a particular trunk line may depend on a rate at which the data stream is output by the terminal device. In exemplary embodiments, each channel of the switch is user programmable to accept a plurality of combinations of terminal devices operating at either the same or different data rates. In the embodiments illustrated in the table below, the composite symbol rate for any of the different traffic configurations remains a constant 1.08 M symbols/s. Of course, the symbol rate on the trunk lines T1–TN depends on the particular coding scheme used on the trunk line. In embodiments where cyclic codes, Reed-Solomon codes, convolutional codes, and/or CDMA codes are utilized, the output symbol rate may vary depending on the coding scheme. For example, the output symbol rate may be 2.4576 M symbols/s with the additional symbols representing the overhead associated with the coding scheme.

| Rate of use | No. Of Users | Rate (Ksymbols/s) | Available bit rate (Kbits/s) | Desired rate (K bits/s) | Excess slots (in 9 frames) |
|---|---|---|---|---|---|
| 120/120 | 1 | 1,080 | 4320 | | |
| 60/120 | 2 | 540 | 2160 | 1544 | 308 |
| 4/120 | 30 | 36 | 144 | 144 | 0 |
| 2/120 | 60 | 18 | 72 | 64 | 480 |
| 1/120 | 120 | 9 | 36 | 32 | 480 |

The combined rate of the data streams in each trunk line may be the same as the combined rate of the data streams input into every other trunk line. Matching the data rates associated with all of the trunk lines in the system substantially simplifies the control logic and switching logic required for routing messages throughout the switch 2. Additionally, where the sampling rates (rate of the data stream) for each terminal device is selected to be an integral multiple of the sampling rate of the slowest terminal device, an extremely flexible architecture for the switch 2 is facilitated to allow simultaneous switching of channels having a plurality of sampling rates, without modifying the switch operation.

Further, by configuring the switching circuits of the switch 2 to correspond to the frame size of the slowest rate channel, faster sampling-rate channels may occupy a plurality of the slowest rate time slots in the time division multiplexed trunk lines T1, T2, T3, . . . TN. In this manner, an integral number of samples from each faster-rate terminal device are copied to/from a plurality of time slots in the trunk line data streams while the only one sample is copied to/from each of the slowest terminal devices. As the combination of services and associated terminal devices are changed, the switching function of the switch 2 may be easily adapted under software control, e.g., by simply modifing a permutation list RAM in the time-space-time switch 26, and/or batching circuits 30.

The rate of samples received from the recovery circuits 31 may remain at a fixed rate even with the use of higher rate terminal devices by simply varying the number of parties associated with a particular trunk line. For example, multiple data rates may also be supported with a fixed output from the recovery circuits 31 by simply varying the number of parties/terminal devices involved. In other words, when the sample rate of each of the devices is doubled, the trunk line may only support half as many parties/terminal devices. A fixed rate of samples output from the recovery circuits simplifies the batching circuits 30 as discussed in more detail below.

The batching circuits 30 may be structured to group or batch together samples associated with the same terminal device before switching the samples. The grouping or batching of the samples from a particular terminal device allows the switch to be substantially simplified. Further, the batching operation allows the switch to operate at a substantially slower frequency. For example, where eight samples are batched together, the switch may operate at ⅛ the frequency of a switch where the samples are not batched together.

The batching circuits 30 may perform a matrix transposition where samples received in a first order are output in a second order. A frame time may be defined to be the period of time required to obtain at least one sample from every call in progress, e.g., one sample from each active terminal device. Consequently, the frame time is invariant from frame to frame. For example, the frame time may correspond to the sample time of the slowest rate channel, e.g., a 32 kb/s channel. Further, multiple samples from a given terminal device can appear in each frame (as will be the case due to multiple sampling rates), but the routing of samples in all frames is typically identical until a call set-up or termination occurs.

An exemplary embodiment of the batching circuits may be described with reference to FIG. 2. In this embodiment, samples are read into memory banks A and B in a first order and read out of the memory banks in a transposed order. The memory banks A, B may be configured in a double buffered configuration where data is written into memory bank A while data is read from memory bank B. Thereafter, data is read from memory bank A while data is being written into memory bank B. Referring specifically to FIG. 2, a clock increments a programmable counter 44. The output from programmable counter 44 may be utilized to toggle a control bit 41. The programmable counter is programmable to any modulus based on software control. Further, is some embodiments, the programmable counter may include two or more counters which are cascaded and each programmable to any modulus. The output of counter 44 may be utilized to address the contents of a permutation list RAM 40. Generation of the address sequences necessary to read out the sequentially-stored input samples in transposed order can be achieved by use of a stored, pre-computed list of addresses as illustrated in this example. The "permutation list RAM" in FIG. 2 holds this list. The output of the programmable counter 41 and permutation list RAM 40 may be input in to the address inputs of memory banks A and B 36, 35 under control of the respective multiplexers A and B 34, 33.

In a first mode of operation (control bit=1), memory bank A stores data from the recovery circuits 31 (via buffer 39) in sequential order in accordance with the address provided by programmable counter 44. Simultaneously, memory bank B is outputting data via multiplexer C and shift register 43 in a transposed order as determined by addresses stored in the permutation list RAM 40. Similarly, in a second mode of operation (control bit=0), memory bank B stores data from the recovery circuits 31 (via buffer 38) in sequential order in accordance with the address provided by programmable counter 44. Simultaneously, memory bank A is outputting data via multiplexer C and shift register 43 in a transposed order as determined by addresses stored in the permutation list RAM 40. In this manner, memory banks A and B are double buffered such that a constant high rate of throughput is maintained while the batching of data is performed.

The parallel shift register 43 may be configured in any suitable manner such that the data is output in a bit serial manner. For example, the shift register may latch one or more symbols in parallel and thereafter output the symbols in a serial fashion.

The memory banks A and B may be configured in any suitable arrangement such as having each storage location capable of storing a single sample.

Although for simplicity of discussion, the addressing of memory banks A and B have been described in terms of a permutation list RAM, it will be readily apparent to those skilled in the art that one or more programmable counters may be utilized in place of the permutation list RAM. In particular, an index arithmetic structure capable of incrementing addresses by offsets other than unity and with a provision for automatic modulo-record-size arithmetic to effect wrap-around may be utilized to accomplish the batching function.

Control to any of the elements of the batching circuits 30 may be provided in any suitable manner as is well known to those skilled in the art. For example, a carry from the programmable counter 44 may set a control bit. The control bit may be utilized for control of the various functions of the batching circuits such as controlling the multiplexers A, B, and C, the memory banks A, B, the parallel shift register 43 and the associated control and buffering circuits 37, 38, and 39. In the illustrated embodiment, the control bit is set to toggle once a predetermined number of frames have been assembled in the memories.

The size of memories A and B may be selected for the maximum anticipated number of samples that may need to be buffered (in the case above, the smallest binary number that is greater than (the number of frames) * (the number of users) by the sample size. For example, in the restricted band voice service service where there are 120 users, with each user having a single slot within a frame, it may be desirable to batch together 8 or more frames such that each user has 8 samples batched together before proceeding through the switch. In general, a pair of 32-bit wide by 120-word (4-bit nibble) memory cells may be utilized as the memory banks A, B. In this configuration, samples from each of NU terminal devices in a first frame would be written into the first row, samples from the second frame would be written into the second row, etc., until all 8 successive frames have been written into the memory. Where all terminal devices operate at the same rate, the memory would hold 8*NU samples and is, therefore, complete.

Thereafter, the block of NU 32-bit columns is read out, one word at a time, as batched samples (parallel data groups) during the period that the successive frames are written into the next memory bank. For the 32 kb/s service, the number of 32-bit words aggregated before output transfer beings is 120, or the value of NU. However, with higher rate data services the number of successive frames required to batch a parallel data group diminishes because the number of samples for a particular terminal device per frame increases with in increase in the data rate of the terminal device supplying a particular frame. Where the service includes terminal devices operating at a T1 rate, then NU=30 and only 2-frames are required for the batching circuits 30 to assemble a parallel data group having 8 samples. The control circuitry for addressing the memories may be modified accordingly under software control to accommodate a different mix of transfer rates.

The shift register 43 may be alternately configured to output the data in a serial manner, one data group at a time, and/or in a parallel with an entire parallel data group being output. Further, in some embodiments, the shift register may not be required. In one preferred embodiment, the shift register 43 is included to reduce the peripheral pin count to the subsequent multiplexer devices; with a total of 176 data streams routed to this multiplexer in one embodiment, the number of physical connections is reduced to an acceptable level by use of this serialization of the data.

The specific example illustrated in FIG. 2 shows recovery circuits 31 outputting a 4-bit symbol at a rate of 2.4576 Ms/s, and the batching circuits output samples at a rate of 1 bit at 4×2.4576 MHz. In alternate embodiments, the double buffered memory arrangement may be replaced with a dual port ram having the same effective memory size.

Figure 3:
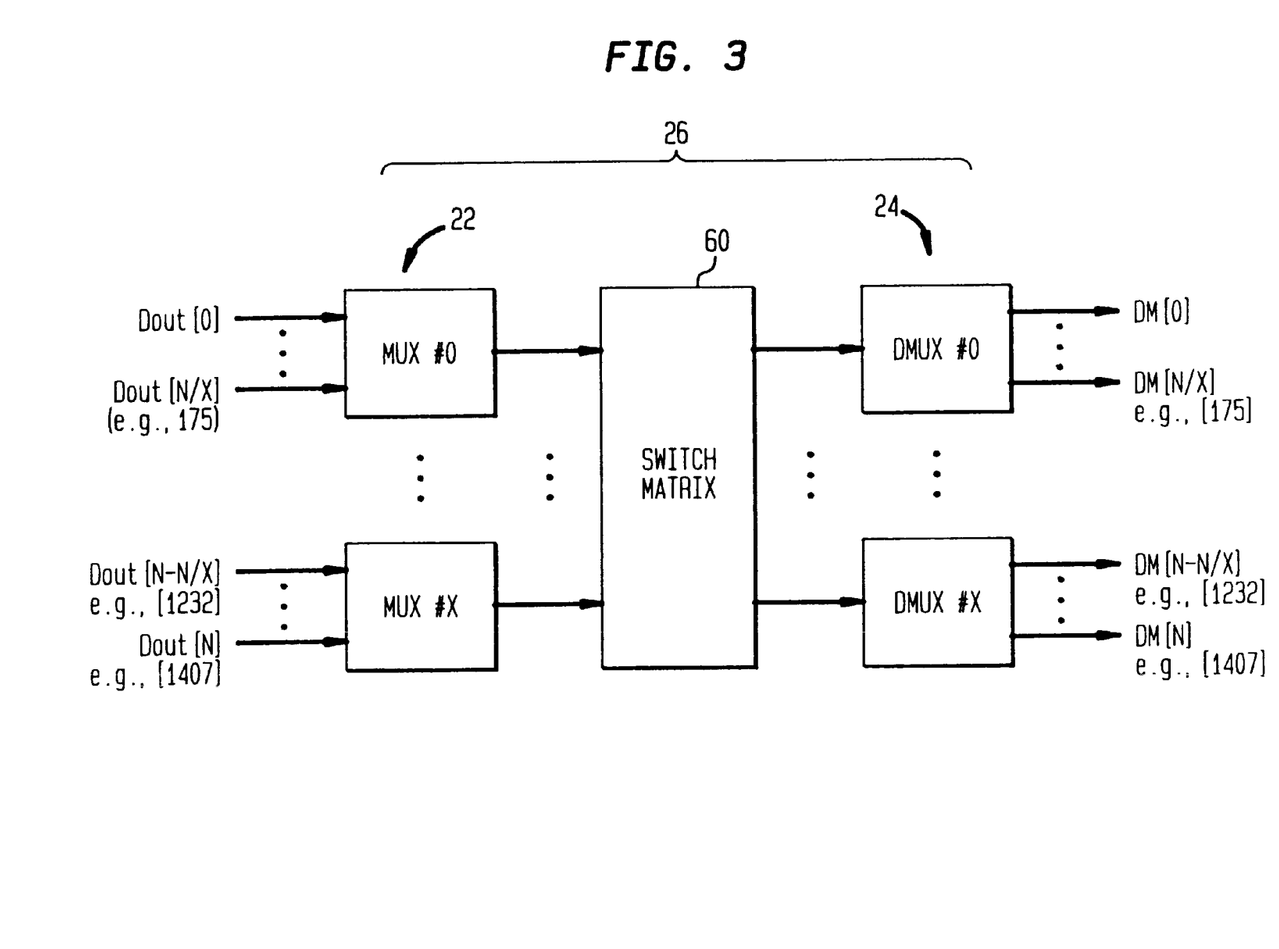
FIG. 3 is a block diagram of the switch, multiplexer, and demultiplexer shown in FIG. 1.

Returning to the time-space-time switch 26 of FIG. 1, FIG. 3 shows an exemplary embodiment of the time-space-time switch 26. As shown in FIG. 3, the input multiplexer 22 may comprise a plurality of multiplexers Mux 0–Mux x, each having N/x inputs. In exemplary embodiments, where N=1408, x would equal 176. Thus, in this embodiment, each multiplexer would have 176 distinct inputs. Similarly, the output demultiplexer 24 may comprise a plurality of demultiplexers DMUX 0–DMUX x, each having N/x inputs. In exemplary embodiments, where N=1408, x would equal 176 and each demultiplexer would have 176 distinct inputs.

Figure 4:
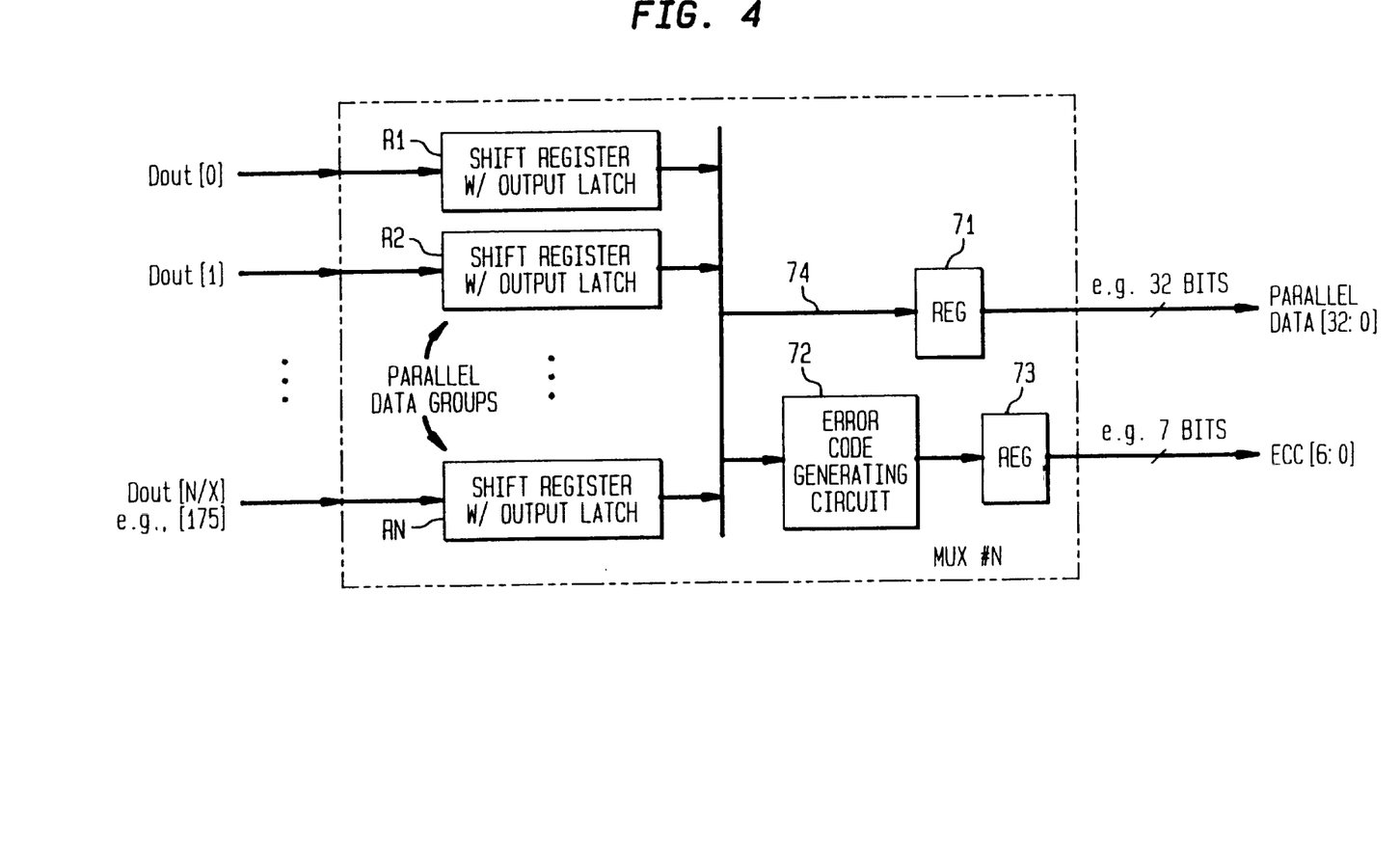
FIG. 4 is a block diagram showing details of the multiplexer shown in FIG. 3 together with associated error code generating circuits.

FIG. 4 shows an exemplary embodiment of one of the multiplexers, e.g., Mux 0. The multiplexer Mux 0 may comprise a plurality of shift registers R1, R2, . . . RN coupled together in parallel and selectively enabled onto an output bus 74. Each of the shift registers R1–RN may include an output latch for outputting the contents of the shift register as a parallel data group onto the output bus 74. The parallel data groups may be variously configured depending on the particular configuration of the batching circuits 30 discussed above in conjunction with FIG. 2. In the exemplary embodiment shown in FIG. 4, the parallel data groups comprise 8 samples or 32 bits. The shift registers R1–RN are duplicated so that, after one copy of each shift register is filled, input transfer from the corresponding recovery circuit may continue while all of the filled instances of shift registers are successively copied to the parallel output bus 74 (32 bits in width in this example).

Concurrently, the parallel data groups are input into the error generating circuit 72 which generates a error correction and/or detection code for the parallel data group. The error correction and/or detection code is thereafter stored in register 73. In the illustrated embodiment, a hamming code which provides double bit detection and single bit correction is utilized. Where the parallel data groups are 32 bits, the associated error correction and/or detection code may be, for example, 7 bits where double bit detection and single bit correction are desirable. The use of parallel data groups and batching has significant advantages where a error correction and/or detection code is utilized. Since all of the samples within a parallel data group are routed through the switch together, a single error correction and/or detection code may be associated with the same parallel data group throughout the switch. Further, the ratio of the error bits/data bits required to protect a parallel data group decreases substantially as the parallel data group increases in size. Accordingly, the batching operation allows for efficient error correction and/or detection of data passing through the switch matrix 60. This is particularly useful where the switch 2 is disposed in a satellite or utilizes fast, high density memories which may be more susceptible to soft errors.

Figure 5:
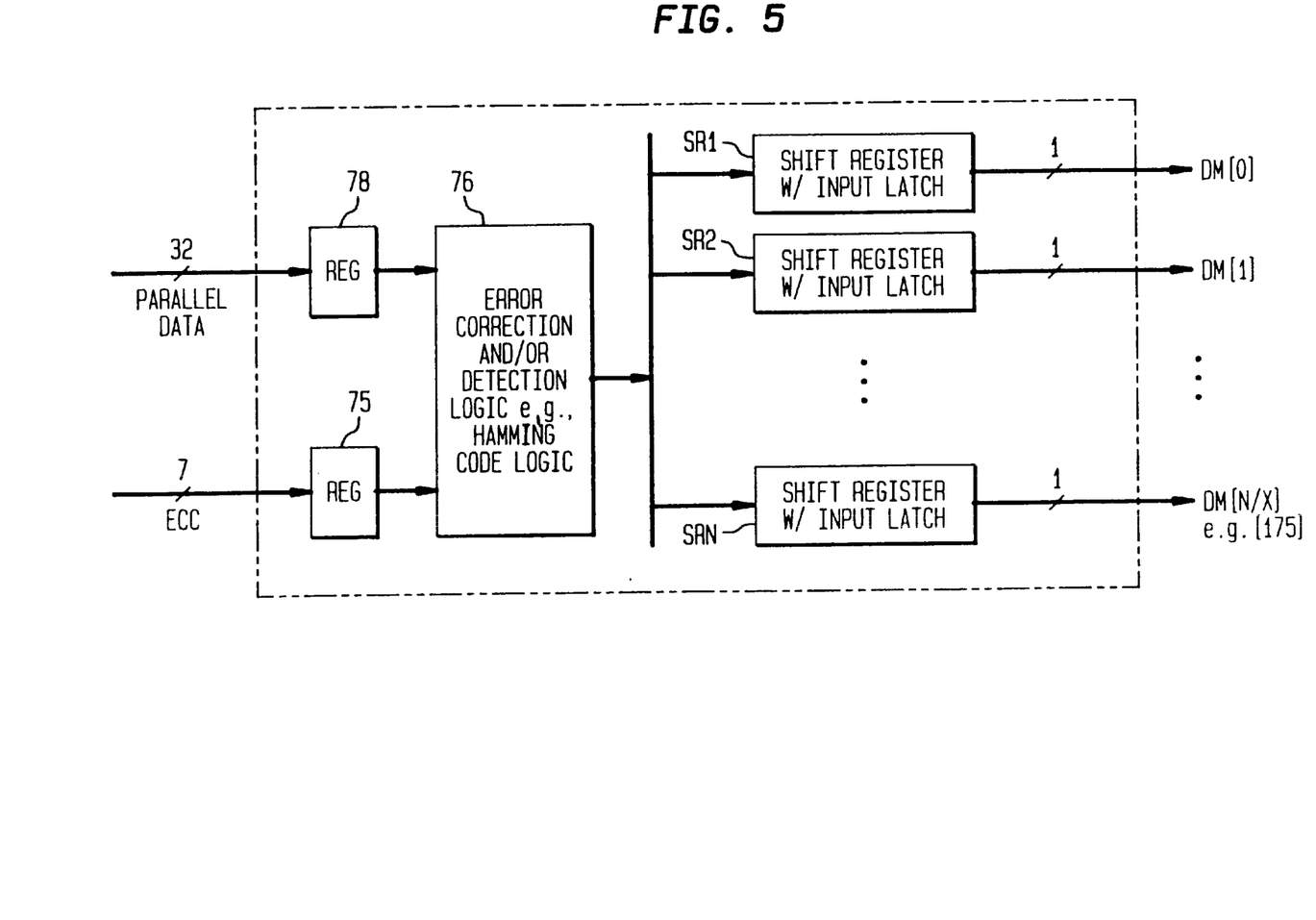
FIG. 5 is a block diagram showing details of the demultiplexer of FIG. 3 together with associated error code checking circuits.

FIG. 5 shows an exemplary embodiment of one of the demultiplexers, e.g., DMUX 0. The demultiplexer DMUX 0 may comprise a parallel data input register 78 and a parallel data error correction and/or detection register 75 coupled to the input of DMUX 0. The parallel data input register 78 and parallel data error correction and/or detection register 75 outputs data into the error correction and/or detection logic 76. The error correction and/or detection logic 76 may correct and/or detect errors in the parallel data groups prior to outputting the parallel data groups to one of a plurality of input latches associated with shift registers SR1, SR2, . . . SRN. Shift registers thereafter may output information serially onto one or more demultiplexer output channels DM. As a dual of the multiplexer, the demultiplexer similarly includes shift registers to support serial-by-bit data transfers to constrain the number of pins required for a large number of concurrent transfers.

The error correction and/or detection circuits 76 may be variously configured to accommodate any suitable error correction and/or detection scheme. Further, the error correction and/or detection logic may be coupled to a switch control processor. The switch control processor may be coupled to every circuit in the switch 2 for coordinating and controlling aspects of the switch 2. The switch control processor may operate to switch in one or more redundant modules or circuits dependent upon the results of the error correction and/or detection logic 76. Where the switch 2 is located in a satellite, the switch control processor may be coupled to a ground based control station and may include a separate control channel for receiving routing and other control information.

Figure 6:
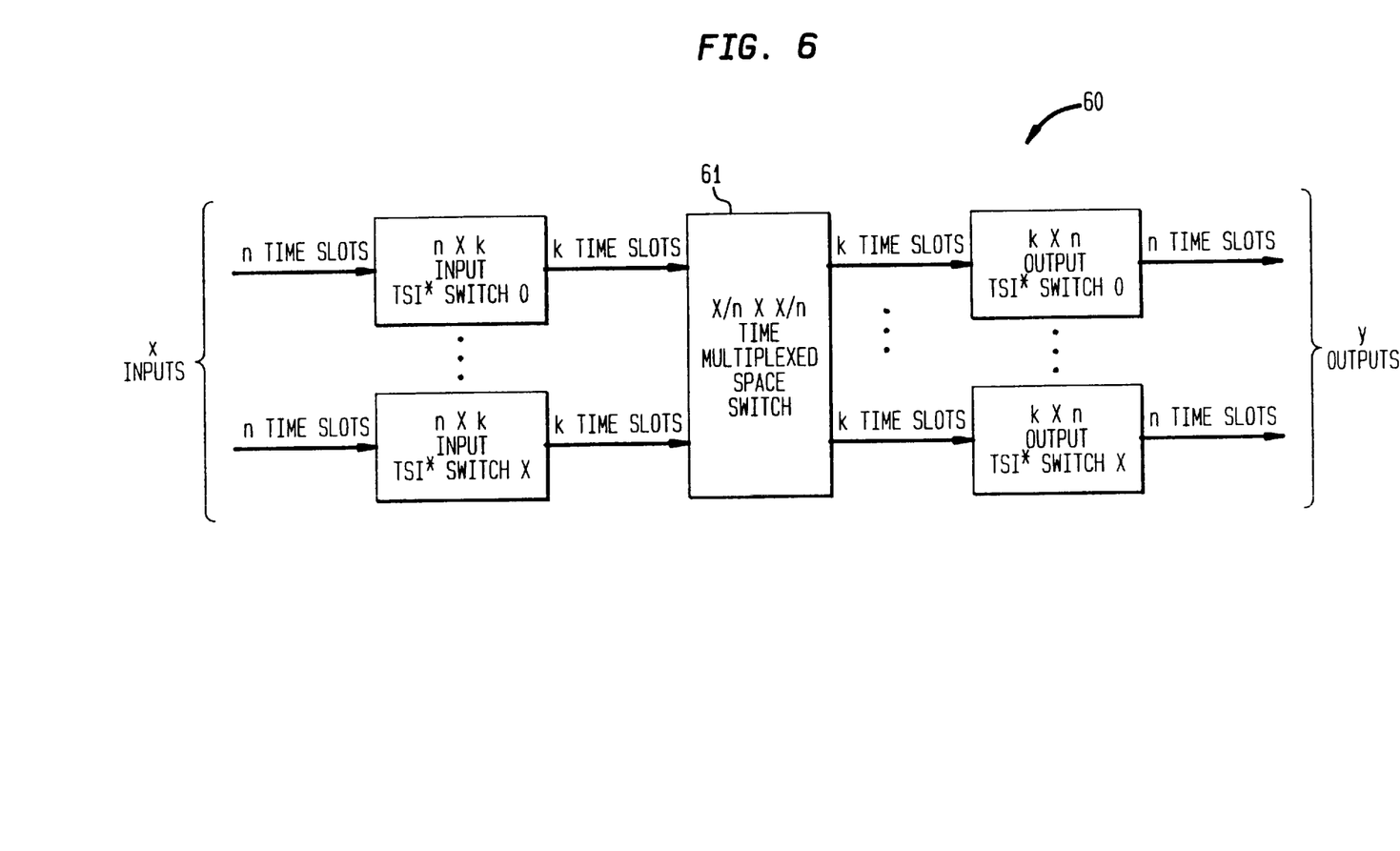
FIG. 6 is a block diagram showing details of the switch shown in FIG. 3.

FIG. 6 shows details of the switch matrix 60 shown in FIG. 3. The time multiplexed space switch 61 is configured conventionally in a circuit switch arrangement where one of the inputs is coupled to a selected one of the outputs in accordance with a time scheduled routing table. However, the inputs and outputs to the time multiplexed space switch 61 may be buffered and permuted using a plurality of time slot interchange modules (TSI modules). For example, in one exemplary embodiment, a plurality of input TSI switch modules are coupled between the inputs to the switch 60 and the time multiplexed space switch 61. Similarly, a plurality of output TSI switch modules are coupled between the outputs of the switch 60 and the time multiplexed space switch 61. In this configuration, the plurality of input TSI switch modules (input TSI switch 0–input TSI switch X) are respectively coupled to the plurality of inputs of the time multiplexed space switch 61 and the plurality of output TSI switch module (output TSI switch 0–output TSI switch X) are respectively coupled to the plurality of outputs of the time multiplexed space switch 61. The number of inputs and outputs into the switch matrix 60 may be selected as discussed above.

The individual TSI modules may be variously configured. In the embodiment shown in FIG. 7, the TSI modules may include matrix permutation logic which allows the combined trunk line data streams input into each of the inputs of switch matrix 60 to be output in a permuted order. It should be noted that the same circuit configuration may be utilized for both the input and the output TSI modules where the same data size is utilized for both the input and output. The TSI modules may be double buffered using two banks of memory such that data is stored in the first bank while data is being read out of a second bank in a permuted order. The double buffering allows data going to the same outputs of the switch to be further grouped together such that the capacity of the switch may be substantially increased. In the exemplary embodiments, the switch is adapted to accommodate 180,000 or more simultaneous connections.

Figure 7:
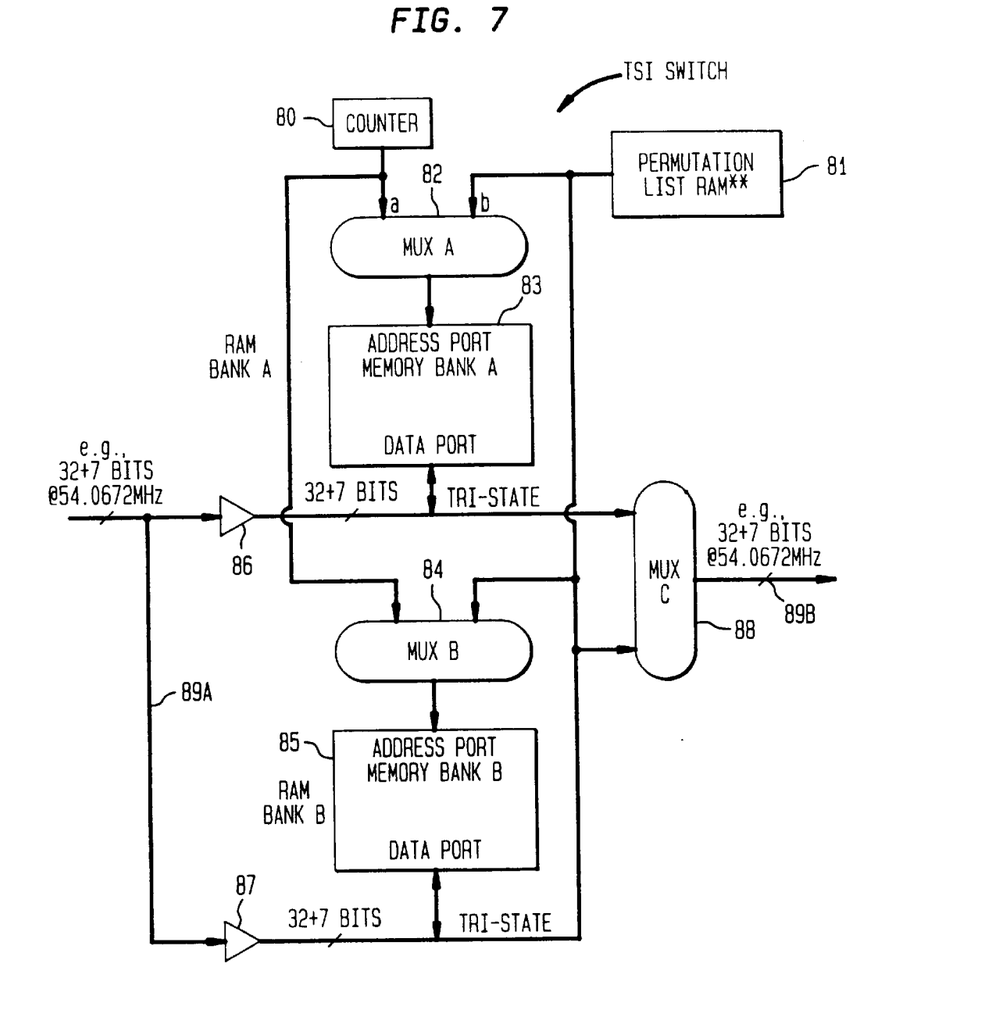
FIG. 7 is a block diagram showing details of the TSI modules shown in FIG. 6.

Referring to FIG. 7 specifically, an input bus 89A may be configured for serially inputting a plurality of parallel data groups and associated error correction and/or detection codes into one of the first and second memories 83, 85. In an exemplary embodiment, the first memory 83 may be filled during a first phase. For example, when the first memory 83 is selected, parallel data groups and associated error correction and/or detection bits are written into the data port of the first memory 83 in any suitable order as indicated by programmable counter 80. The counter 80 may operate to store the parallel data groups in sequential order. During the storing operation into the first memory 83, the buffer 86 is enabled and the memory 83 is operated in a write mode. Additionally, the multiplexer 82 may be configured to pass the output from counter 80 to an address port of the first memory 83. In this manner, the first memory is filled with successive parallel data groups and any associated error correction and/or detection bits. When the first memory 83 had been completely filled and/or received a predetermined number of parallel data groups and associated error correction and/or detection bits (if any), a second phase is initiated.

In the second phase, buffer 86 disconnects the incoming parallel data groups from the first memory and buffer 87 connects the incoming parallel data groups to the second memory. The second memory is then operated in a write mode. Parallel data groups may be read into the second memory 85 in accordance with addresses provided by the counter 80 via multiplexer 84. In this manner, the second memory is filled with parallel data groups in the same manner as discussed above with regard to the first memory.

At the same time that the second memory 85 is being filled with incoming parallel data groups, previously received parallel data groups stored in the first memory 83 are being output to output bus 89B. During the second phase, the first memory 83 receives an address input from permutation list RAM 81 via multiplexer 82. A parallel data group stored in a location selected by the output of the permutation list ram 81 is then output from the first memory via multiplexer 88 and onto the output bus 89B via multiplexer 88. The permutation list RAM 81 causes the parallel data groups to be output in a permuted order in accordance with data stored in the permutation list RAM. The configuration of the permutation list RAM 81 is under software control and may be adopted to different data rate mixes being enabled as various terminal devices are connected and disconnected and calls are set-up and disconnected.

When the entire contents of the first memory 83 have been output and the parallel data groups have been input into the second memory 84, the banks switch again and the incoming parallel data groups are now input into the first memory 83 as discussed above. Meanwhile, data from the second memory 85 is output via multiplexer 88 to the output bus 89B in accordance with the the contents of the permutation list RAM 81 as discussed above. Where the TSI switch is utilized as an input TSI switch, the addressing order stored in the permutation RAM 81 is optimized to minimize the amount of switching required by the time multiplexed space switch 61. Accordingly, parallel data groups stored in one of the double buffered memories which are to be routed to the same output of the time multiplexed space switch 61 are grouped together. Further, the contents of each of the permutation RAMs 81 are coordinated to minimize contention for a particular output port of the time multiplexed space switch 61. By utilizing an appropriate scheduling algorithm, the switch 2 may be made non-blocking. In other words, by using well known scheduling algorithms in conjunction with the double buffering and batch arrangement, efficient throughput is allowed without the need for blocking data on a particular channel while other data are processed.

Similarly, where the TSI switch is utilized as an output TSI switch, the addressing order stored in the permutation RAM 81 is optimized to prevent contention when latching the output parallel data groups into one of the shift registers of the demultiplexers DMUX 0–X. Further, the scheduling algorithm may be optimized to ensure that the parallel data groups are output in time sequence with the parallel data groups for each terminal device being output in time sequential order.

The sizes of the programmable counter 80, permutation RAM 81, and memories 83, 85 may be variously configured. In one exemplary embodiment, the programmable counter includes 14 bits such that up to 32 k parallel data groups may be addressed. The programmable counter 80 may include one or more cascaded stages which may be set under software control to have any modulus.

Figure 8:
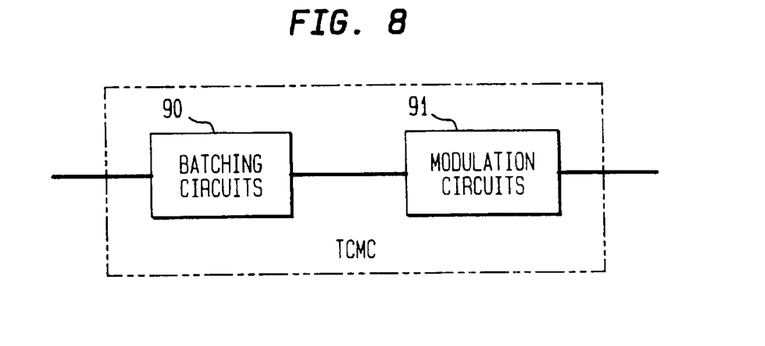
FIG. 8 shows a block diagram of details of the TCMC circuits shown in FIG. 1.

FIG. 8 shows details of the TCMC circuits shown in FIG. 1. Each of the TCMC circuits may include batching circuits 90 which unbatch the data received from the time-space-time switch 26 to ungroup the data from a particular terminal device and interleave the data with data from other terminal devices. The batching circuits 90 employed in the TCMC circuits operate in a reverse order of the batching circuits 30 discussed above with respect to FIG. 2. When used in the TCMC circuits, the batching circuits of FIG. 2, for example, may write the data into the memory 40 a row at a time and read the data out of the memory 40 a column at a time to thereby ungroup the data and restore the data to a time division multiplexed format with individual time slots for a particular terminal device. There after, the time division multiplexed data output from the batching circuits 90 may be transmitted to one of the earth stations, concentrators, and/or terminal devices using any suitable mechanism such as modulation circuits 90.

In operation, a plurality of first data streams respectively received from a plurality of first terminal devices A1, A2, and A3 are time division multiplexed into a first trunk line data stream. Similarly, a plurality of second data streams respectively received from a plurality of second terminal devices B1, B2, and B3, are time division multiplexed into a second trunk line data stream. In exemplary embodiments, the above process is repeated such that a large number (e.g., about 180,000) terminal devices each producing data streams are multiplexed onto a plurality of associated trunk lines to form trunk line data streams. The trunk lines and/or terminal devices may be coupled directly to the switch or coupled to the switch through some other medium such as an earth station or microwave transmission station. Accordingly, it may be desirable to modulate the trunk line data streams.

Where earth stations are utilized, the earth stations transmit the modulated trunk line data streams to a satellite. The earth stations may transmit the data on a single channel, or on a plurality of channels which may occupy the same or a different frequency band. In the satellite, the trunk line data streams may be demodulated and switched to a selected output. The data streams from the individual terminal devices are switched to a selected output of the switch based on a routing table. In preferred embodiments, the routing table is dynamically variable to accommodate different mixes of traffic. The routing table may be dynamically varied in accordance with information uploaded to the switch. The routing table may vary with every call set-up/termination and/or with new equipment mixes added to the system. In accordance with the routing table, data streams from individual terminal devices are selectively routed to a particular destination via the switch. Where the trunk lines are modulated, the data streams may be reassembled and modulated prior to exiting the switch. Data transmitted from the switch may occupy only a single channel or a plurality of channels and occur over one or more different frequency bands. Upon receipt by the earth station, concentrator, and/or terminal device, the trunk line data stream may be demodulated and/or demultiplexed to recover the data stream to be distributed to an individual terminal device. The above described multiplexing, modulation, transmission, demodulation, switching, remodulation, transmission, demodulation, and demultiplexing may occur for any number of terminal devices and trunk lines as described herein.

Further, the switching may include one or more matrix transpositions to group data prior to switching and/or ungroup data after switching. Further, data from a particular terminal device and/or channel may be batched together in a parallel data group before the switching operation. The batching operation may include the step of generating an error correction and/or detection code for the parallel data group. After the switching step, the switch may incorporate a step of checking the error correction and/or detection codes.

In an exemplary mode of operation, the switch receives a plurality of first time division multiplexed data streams DA1, DA2, DA3 respectively from a plurality of first terminal devices A1, A2, and A3 on a first input channel of a switch. Simultaneously, the switch receives a plurality of second time division multiplexed data streams DB1, DB2, DB3 respectively from a plurality of second terminal devices B1, B2, and B3 on a second input channel to the switch. Further, any number of additional input channels, data streams, and terminal devices may also be input into input channels of the switch in the same manner as discussed above. The switch may then batch together data in different time slots from each of the plurality of first and second time division multiplexed data streams into a plurality of parallel data groups such that data received in different time slots which originates from the same terminal device is grouped together in a single parallel data group. Error detection and/or correction codes may be generated for each of the parallel data groups. The parallel data groups may then be switched onto a selected output of the switch using any suitable circuit switching arrangement as discussed above. The parallel data groups may be switched in accordance with a routing table. Errors detected using the error correcting codes may thereafter be corrected and/or detected. The plurality of parallel data groups may thereafter be unbatched in any suitable manner. It may be desirable to reorder the data samples as time division multiplexed data and to remodulate the data before outputting the data from the switch. Additionally, it may be desirable to perform a further permutation prior to and immediately after the switching function to group data destined for the same switch output together as the data is passed through the switch. Where a further permutation is utilized, it may be useful to perform the permutations using double buffering.

While an exemplary, non-blocking switch embodying the present invention is shown, it will be understood, of course, that the invention is not limited to this embodiment. Modifications may be made by those skilled in the art, particularly in light of the foregoing teachings. It is, therefore, intended that the appended claims cover any such modifications which incorporate the features of this invention or encompass the true spirit and scope of the invention. For example, each of the elements and/or steps of the aforementioned embodiments may be utilized alone or in combination with other elements and/or steps from other embodiments.

I claim:

1. An apparatus comprising:
   a circuit switched switching system including:
      an input which receives data including first data in a first sequence and second data in a second sequence;
      a first memory coupled to the input and which stores the first data;
      a second memory coupled to the input and which stores the second data;
      a third memory coupled to the first and second memories and which stores a permutation list, such that the first memory reads out the first data in a third sequence in accordance with the permutation list, the second memory reads out the second data in a fourth sequence in accordance with the permutation list; and an output coupled to the first and second memories which outputs the first data in the third sequence and the second data in the fourth sequence, wherein the first data is provided from the input to the first memory during a first cycle and the second data is provided from the input to the second memory during a second cycle different from the first cycle, the circuit switched switching system being configured such that the first data is read out from the first memory during the second cycle and the second data is read out from the second memory during the first cycle.

2. The apparatus of claim 1, wherein the circuit switched switching system further includes:
a first buffer coupled between the first memory and the input; and
a second buffer coupled between the second memory and the input.

3. An apparatus comprising:
a circuit switched switching system including:
   a first counter which generates a first plurality of addresses in a first sequence;
   a first memory coupled to the first counter and which writes first data in locations of the first memory in accordance with the first plurality of addresses in the first sequence; and
   a second memory coupled to the first memory and which stores the first plurality of addresses, and which reads out the first plurality of addresses from the second memory in a second sequence different from the first sequence, such that the first memory reads out the first data in accordance with the first plurality of addresses in the second sequence;
wherein the circuit switched switching system further includes:
   a second counter which generates a second plurality of addresses in a third sequence;
   a third memory coupled to the second counter and which writes second data in locations of the third memory in accordance with the second plurality of addresses in the third sequence; and
   a fourth memory coupled to the third memory and which stores the second plurality of addresses, and which reads out the second plurality of addresses from the fourth memory in a fourth sequence different from the third sequence, such that the third memory reads out the second data in accordance with the second plurality of addresses in the fourth sequence.

4. The apparatus of claim 3, wherein the circuit switched switching system further includes a time multiplexed space switch having an output port and coupled to the first and third memories, the time multiplexed space switch having an output port and coupled to the first and third memories, such that the time multiplexed space switch receives the first and second data as read out from the first and third memories and outputs at least a portion of the first and second data at the output port, the second and fourth sequences being selected so as to minimize contention between the first and second data at the output port of the time multiplexed space switch.

* * * * *